United States Patent [19]

Slingerland, Jr.

[11] Patent Number: 5,035,023
[45] Date of Patent: Jul. 30, 1991

[54] VEHICULAR WINDSHIELD WIPER APPARATUS

[76] Inventor: Charles R. Slingerland, Jr., 3 Aiken Ave., Rensselaer, N.Y. 12144

[21] Appl. No.: 555,188

[22] Filed: Jul. 20, 1990

[51] Int. Cl.⁵ .............................................. B60S 1/04
[52] U.S. Cl. .............................. 15/250.19; 15/250.16
[58] Field of Search .......... 15/250.19, 250.16, 250 R, 15/250.2, 250.21, 250.42

[56] References Cited

U.S. PATENT DOCUMENTS

| | | | |
|---|---|---|---|
| 1,340,794 | 5/1920 | Russell | 15/250.19 |
| 2,284,844 | 6/1942 | Rappl | 15/250.19 |
| 3,019,468 | 2/1962 | Hatch | 15/250.19 |
| 3,110,920 | 11/1963 | Dangler | 15/250.19 |
| 4,040,141 | 8/1977 | O'Steen | 15/250.19 |
| 4,310,943 | 1/1982 | Palma | 150/250.19 |
| 4,345,352 | 8/1982 | Teraboyoshi | 15/250.19 |
| 4,765,019 | 8/1988 | Ochino | 15/250.19 |

FOREIGN PATENT DOCUMENTS

| | | | |
|---|---|---|---|
| 2326251 | 12/1974 | Fed. Rep. of Germany | 15/250.19 |
| 63551 | 4/1983 | Japan | 15/250.19 |
| 63552 | 4/1983 | Japan | 15/250.19 |
| 100035 | 6/1984 | Japan | 15/250.19 |
| 50854 | 3/1986 | Japan | 15/250.19 |
| 60354 | 3/1986 | Japan | 15/250.19 |

Primary Examiner—Philip R. Coe
Assistant Examiner—Gary K. Graham
Attorney, Agent, or Firm—Leon Gilden

[57] ABSTRACT

Apparatus to space a windshield wiper blade and an associated windshield wiper arm from an associated vehicular windshield is set forth wherein a generally wedge or cam shaped surface deflects the windshield wiper arm and associated blade in a spaced relationship relative to the windshield to minimize excessive contact and premature wear of the windshield wiper structure during use. A mounting block is arranged for securement to the vehicular body or the windshield surface with a cam block including a cam surface adjustably and securably mounted to the mounting block.

4 Claims, 4 Drawing Sheets

VEHICULAR WINDSHIELD WIPER APPARATUS

BACKGROUND OF THE INVENTION

1. Field of the Invention

The field of the invention relates to windshield wiper structure, and more particularly pertains to a new and improved vehicular windshield wiper apparatus wherein the same is arranged relative to vehicular body to space a windshield wiper assembly relative to the windshield to prevent capture of various debris between the windshield wiper blade and windshield during periods of non-use.

2. Description of the Prior Art

Windshield wipers are effective in clearing a windshield of excessive moisture but due to their continuous contact with the windshield surface are subject to deformation. Further, various debris is captured such as twigs and the like whereon actuation of the windshield wiper assembly induces scratching and marring of an associated windshield wiper surface. The instant invention attempts to overcome deficiencies of the prior art by providing a cam surface to deflect and space a windshield lever assembly relative to windshield during periods of non-use. Examples of the prior art include U.S. Pat. No. 3,623,183 to WILFER setting forth windshield wiper blade assembly that accommodates the various contours of a windshield of an associated vehicle.

U.S. Pat. No. 3,733,643 to ARMAN sets forth a windshield wiper for use with automobiles of a predetermined configuration to enhance noiseless operation of the organization in use.

U.S. Pat. No. 3,864,783 to ARMAN sets forth a windshield wiper support organization to enhance articulated relationship between a windshield wiper blade and associated support arm.

U.S. Pat. No. 3,872,535 to ARMAN sets forth a modified support from which wiper blades and permit noiseless operation of the wipers.

U.S. Pat. No. 3,525,114 to SMITH sets forth a linkage arrangement for operating windshield wipers relative to an associated windshield.

As such, it may be appreciated that there continues to be a need for a new and improved vehicular windshield wiper apparatus as set forth by the instant invention which addresses both the problems of ease of use as well as effectiveness in construction in enhancing and prolonging the life of a windshield wiper blade and an associated vehicular windshield and in this respect, the instant invention substantially fulfills this need.

SUMMARY OF THE INVENTION

In view of the foregoing disadvantages inherent in the known types of windshield wiper apparatus present in the prior art, the present invention provides a new and improved vehicular windshield wiper apparatus wherein the same utilizes cam blocks to space a windshield wiper assembly relative to a windshield during periods of non-use. As such, the general purpose of the present invention, which will be described subsequently in greater detail, is to provide a new and improved vehicular windshield wiper apparatus which has all the advantages of the prior art windshield wiper apparatus and none of the disadvantages.

To attain this, the vehicular windshield wiper apparatus of the instant invention includes apparatus to space a windshield wiper blade and an associated windshield wiper arm from an associated vehicular windshield is set forth wherein a generally wedge or cam shaped surface deflects the windshield wiper arm and associated blade in a spaced relationship relative to the windshield to minimize excessive contact and premature wear of the windshield wiper structure during use. A mounting block is arranged for securement to the vehicular body or the windshield surface with a cam block including a cam surface adjustably and securably mounted to the mounting block.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular windshield wiper apparatus which has all the advantages of the prior art vehicular windshield wiper apparatus and none of the disadvantages.

It is another object of the present invention to provide a new and improved vehicular windshield wiper apparatus which may be easily and efficiently manufactured and marketed.

It is a further object of the present invention to provide a new and improved vehicular windshield wiper apparatus which is of a durable and reliable construction.

An even further object of the present invention is to provide a new and improved vehicular windshield wiper apparatus which is susceptible of a low cost of manufacture with regard to both materials and labor, and which accordingly is then susceptible of low prices of sale to the consuming public, thereby making such vehicular windshield wiper apparatus economically available to the buying public.

Still yet another object of the present invention is to provide a new and improved vehicular windshield wiper apparatus which provides in the apparatuses and methods of the prior art some of the advantages thereof, while simultaneously overcoming some of the disadvantages normally associated therewith.

Still another object of the present invention is to provide a new and improved vehicular windshield wiper apparatus which may be compactly stored when not being utilized.

Yet another object of the present invention is to provide a new and improved vehicular windshield wiper apparatus wherein the same enhances effective life of a windshield wiper blade and minimizes erosion of an associated vehicular windshield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
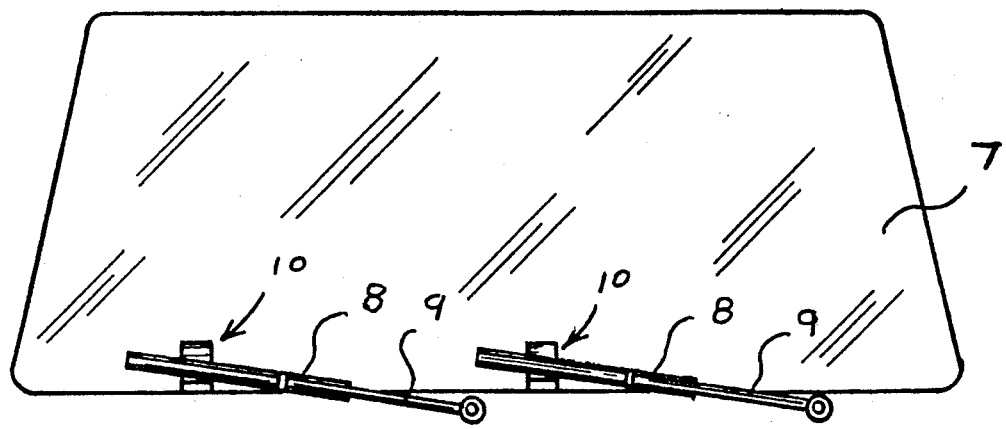
FIG. 1 is an orthographic view taken in elevation of the instant invention in association with a vehicular windshield.
Figure 2:
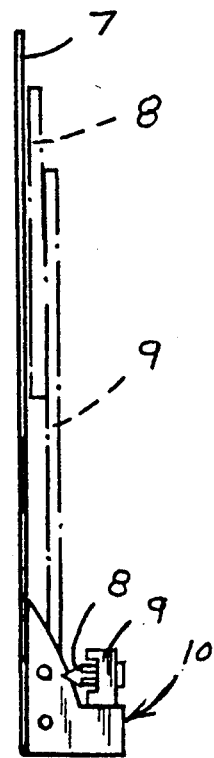
FIG. 2 is an orthographic side view taken in elevation of the organization mounted to an associated vehicular windshield.

With reference now to the drawings, and in particular to FIG. 5 to 8 thereof, a new and improved vehicular windshield wiper apparatus embodying the principles and concepts of the present invention and generally designated by the reference numerals 10,10a, and 10b will be described.

Figure 3:
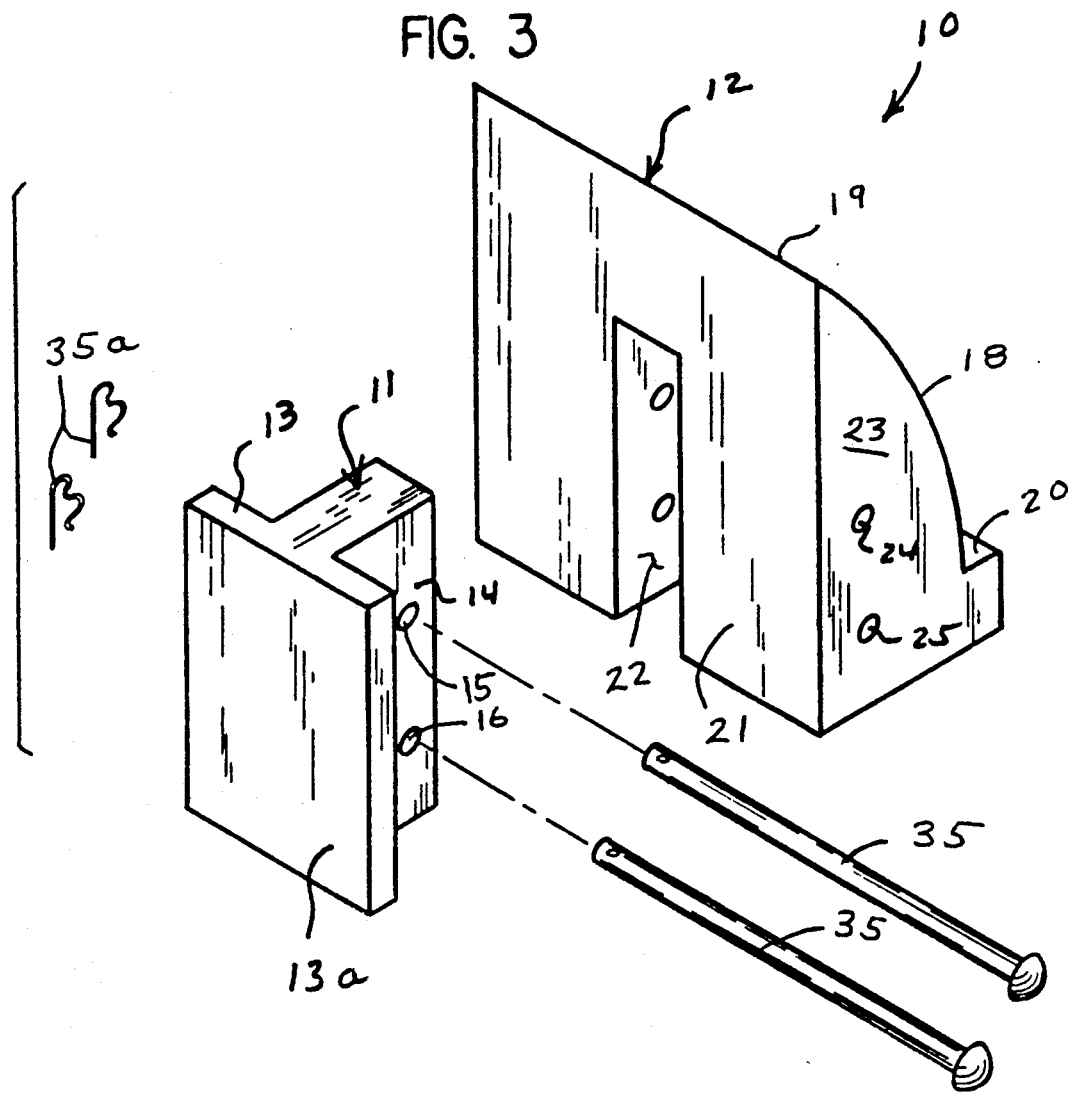
FIG. 3 is an isometric exploded illustration of the instant invention illustrating the various components, their configuration, and relationship.
Figure 4:
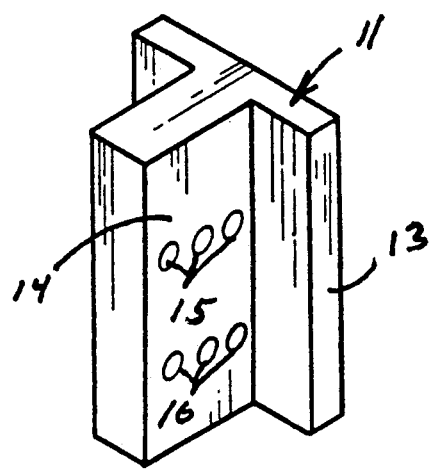
FIG. 4 is an isometric illustration of the mounting block of the instant invention.
Figure 5:
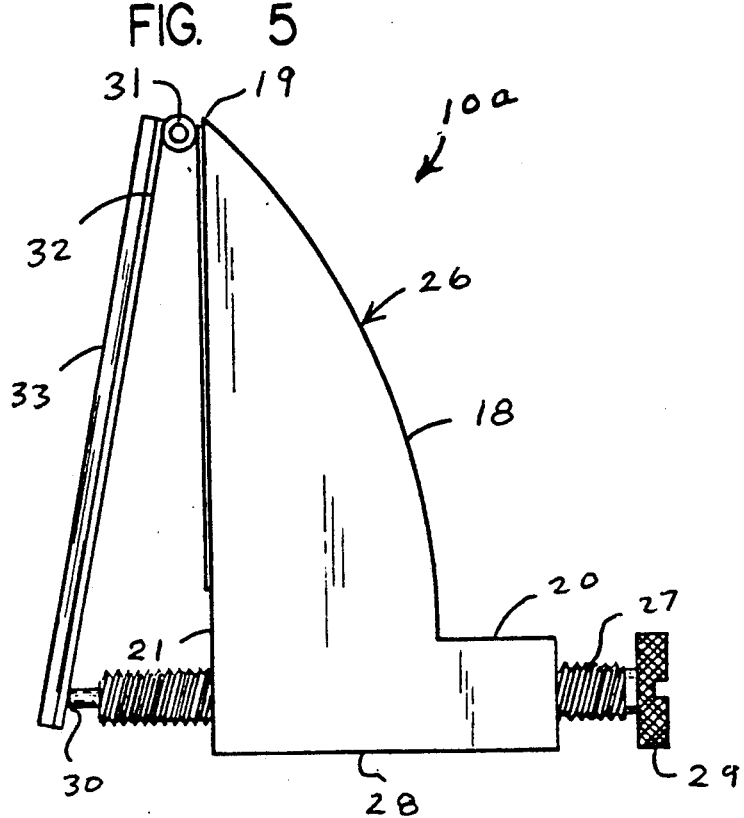
FIG. 5 is an orthographic side view taken in elevation of a modified windshield wiper cam block utilized by the instant invention.
Figure 6:
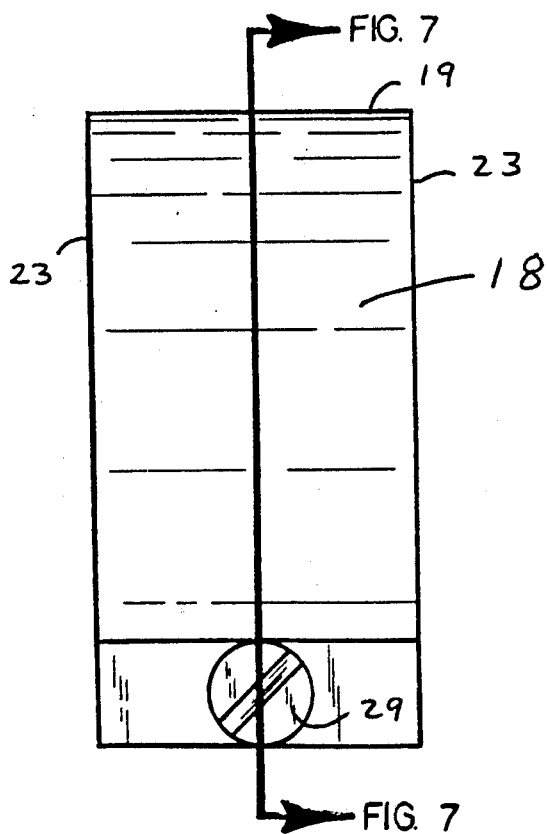
FIG. 6 is an orthographic frontal view taken in elevation of the modified block as set forth in FIG. 5.
Figure 7:
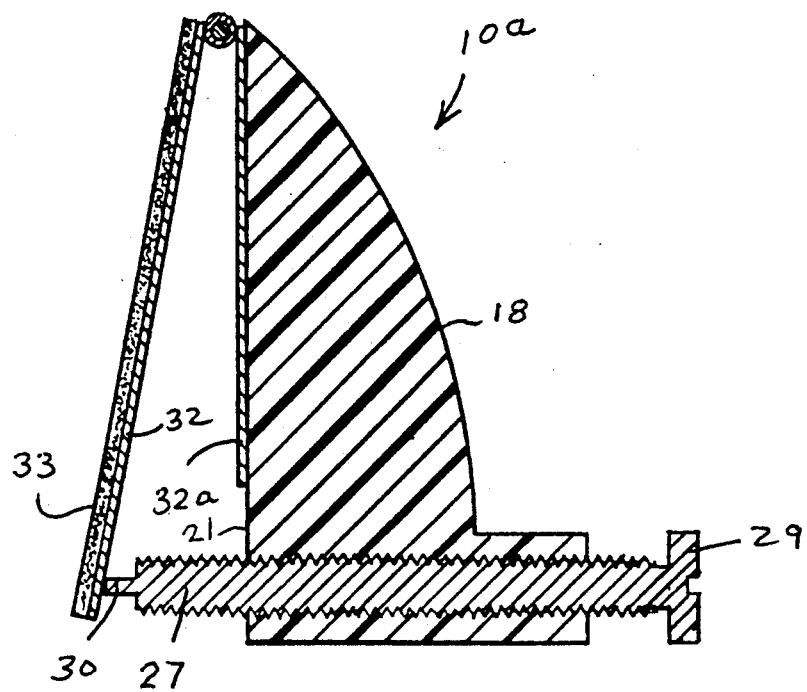
FIG. 7 is an orthographic view taken along the lines 7—7 of FIG. 6 in the direction indicated by the arrows.

More specifically, the vehicular windshield wiper apparatus 10 of the invention includes mounted association at the apparatus to a vehicular body wherein associated vehicular windshield 7. The vehicular windshield 7 includes a plurality of oscillating wiper blade support arms 9 each mounting a resilient wiper blade 8 thereon. To space the wiper blade structure from the associated windshield, a T-shaped mounting block 11 is provided. The T-shaped mounting block may be mechanically or adherably mounted relative to the vehicular windshield to in turn mount a cam block 12 thereon. The cam block 12 includes an arcuate cam surface 18 that originates from an upper apex edge 19 that is aligned relative to an exterior surface of the vehicular windshield 7 and wherein the cam surface 18 is directed downwardly and spaced from the windshield 7 in its orientation relative to the windshield whereupon an at-rest orientation of each windshield wiper arm 9 raises the arm and thereby directs the arm and associated blade 8 outwardly relative to the windshield 7 to prevent undue contact between the windshield wiper blade 8 and the windshield 7 during periods of non-use. The T-shaped mounting block 11 includes a first plate 13 including an exterior surface 13a for securement to the Windshield 7 or to a support surface of the vehicular body underlying the windshield 7. The exterior surface 13a and first plate 13 are orthogonally and integrally formed to a second plate 14. The second plate 14 includes a top row of through extending aligned bores 15 that are arranged orthogonally relative to the first plate 13 overlying and parallel a bottom row of through extending aligned bores 16. The cam block 12 includes an arcuate cam surface 18 as noted above defining an outer surface of the cam block 12 mounting at an upper apex edge 19 and wherein the cam surface 18 extends downwardly and terminates into an abutment surface 20 that is in confronting relationship relative to the surface 18 and extends outwardly beyond the surface 18 as illustrated in FIGS. 3 and 5 for example.

A cam block forward wall 21 extends downwardly relative to the apex edge 19 and terminates downwardly to a cam block bottom wall 28. Directed orthogonally into the cam block forward wall 21 and projecting upwardly from the bottom wall is a relief slot 22 defining a configuration complementary to that defined by the second plate 14. Spaced parallel cam block side walls 23 are arranged orthogonally to the cam block forward wall 21 and include an upper and lower side wall bore 24 and 25 respectively that is directed through the side walls and through the slot 22 to permit selective engagement with the top and bottom row of bores 15 and 16. The upper bore 24 cooperates with one of the selective bores 15 while the lower bore 25 cooperates with one of the aligned bores 16 to permit angulation and selective positioning of the cam block 12 relative to the mounting block 11. Positioning pins 35 are directed through the associated upper and lower bores 24 and 25 and a respective top and bottom bores 15 and 16 to capture the cam block 12 relative to the mounting block 11 with spring lock clips 35a directed through positioning pin openings formed adjacent terminal ends of the pins in a manner as illustrated in FIG. 3.

A modified cam block 26 includes an adjustment screw 27 directed orthogonally through the cam block forward wall 2i defined by a threaded shank whose length is substantially greater than the width of the bottom wall 28 to extend forwardly and rearwardly of the bottom wall 28 and used to permit selective adjustment of a modified cam block relative to an associated mounting plate 32. The adjustment screw 27 is defined by a slotted and knurled head to enhance engagement of the screw to permit adjustment thereof with a screw abutment plate 30 directed forwardly and coaxially of the shank of the adjustment screw 27 and positioned between the cam block forward wall 21 and the mounting plate 32. The mounting plate 32 is mounted to the cam block 12 by a spring hinge 31 to bias the cam block 12 relative to the mounting plate 32 with a cam block mounting plate 32a directed downwardly from the spring hinge 31 to insure capture and positioning of the spring hinge 31 relative to the cam block. An adhesive surface 33 is provided to an exterior surface of the mounting plate 32 to permit selective securement of the mounting plate 32 relative to the associated vehicle.

i 1

Figure 8:
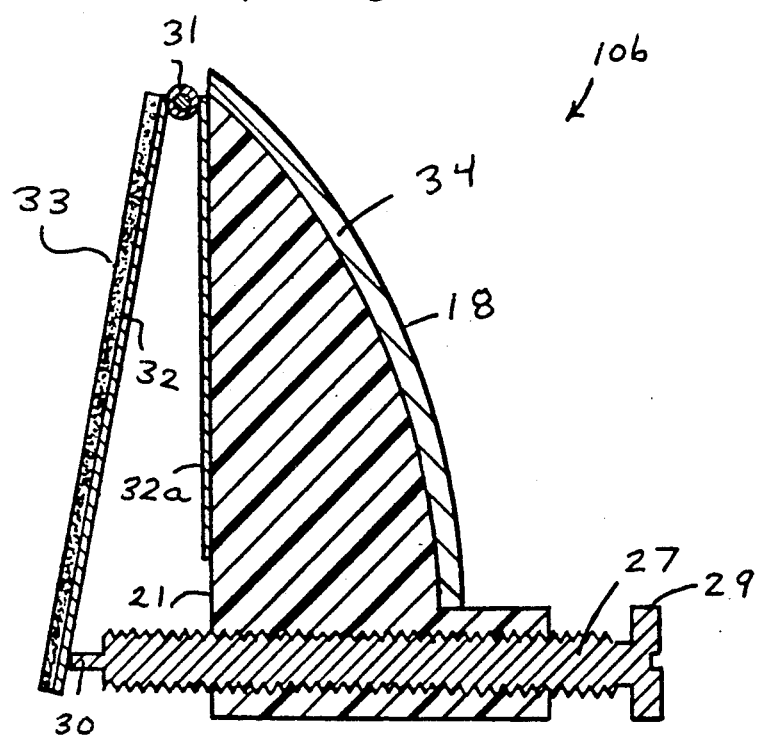
FIG. 8 is an orthographic cross-sectional view of the modified block of the instant invention utilizing a non-corrosive metal insert overlay.

FIG. 8 illustrates the use of a non-corrosive metal insert overlay 34 mounted coextensively with and overlying the outer surface of the cam block 18 to define the arcuate cam surface 18 to minimize erosion and wear of the cam surface for prolonged usage thereof.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicular windshield wiper apparatus for securement of a plurality of windshield wiper support arms relative to an exterior surface of a vehicular windshield wherein each windshield wiper support arm defines a portion of a vehicular windshield wiper assembly, wherein each support arm includes a resilient wiper blade mounted to the support arm and wherein the apparatus comprises, a cam block cooperative with each support arm to space the wiper blade from the vehicular windshield, wherein each cam block includes an arcuate cam surface defining an outer surface of each cam block orthogonally arranged relative to the windshield and the arcuate cam surface includes an upper apex edge and a downwardly extending cam block forward wall, and the arcuate cam surface terminates at a lowermost terminal end and further includes an abutment surface in confronting relationship to the arcuate cam surface to accommodate a windshield wiper arm thereon, and a mounting block including a first plate secured to the cam block to adjustably arrange the cam block relative to the mounting block, and wherein the mounting block further includes a second plate orthogonally arranged and integrally secured to the first plate, the second plate and the first plate defining a "T" shaped cross-sectional configuraton, and the second plate including a top row of through-extending aligned bores orthogonally directed through the second plate, and a bottom row of through-extending aligned bores spaced below and parallel to the top row of through-extending aligned bores, wherein the bottom row of through-extending aligned bores are orthogonally directed through the first plate, and the cam block including a relief slot directed orthogonally into the cam block from the forward wall and wherein the relief slot defines a predetermined configuration complementary of that defined by the second plate.

2. Apparatus as set forth in claim 1 wherein the cam block includes spaced parallel side walls orthogonally arranged relative to the arcuate cam surface and the cam block forward wall wherein the side walls include an upper side wall bore directed and extending through the side walls and the relief slot and a lower side wall bore directed and extending through the side walls and the relief slot wherein the upper and lower side wall bores are parallel relative to one another and orthogonally arranged through the side walls, and an upper and lower positioning pin directed through and receivable to the respective upper and lower side wall bores and one of the said respective top and bottom row of through extending aligned bores to secure the mounting plate in a predetermined adjustable relationship relative to the cam block.

3. A vehicular windshield wiper apparatus for securement of a plurality of windshield wiper support arms relative to an exterior surface of a vehicular windshield, wherein each windshield wiper support arm defines a portion of a vehicular windshield wiper assembly, wherein each support arm includes a resilient wiper blade mounted to the support arm and wherein the apparatus comprises, a cam block cooperative with each support arm to space the wiper blade from the vehicular windshield, wherein each cam block includes an arcuate cam surface defining an outer surface of each cam block orthogonally arranged relative to the windshield and the arcuate cam surface includes an upper apex edge and a downwardly extending cam block forward wall, and the arcuate cam surface terminates at a lowermost terminal end and further includes an abutment surface in confronting relationship to the arcuate cam surface to accommodate a windshield wiper arm thereon, and a first mounting plate spring hingedly secured to a second mounting plate which is integrally mounted to the cam block forward wall said first mounting plate being movable relative to said cam block through said spring hinge, the first mounting plate extending above a cam block bottom wall, the cam block bottom wall orthogonally arranged relative to the cam block forward wall extending rearwardly thereof, and the second mounting plate extending above the bottom wall to the upper apex edge, said spring hinge mounted in alignment with the upper apex edge and biasing the first mounting plate towards the cam block mounting plate, and an adjustment screw directed through the cam block spaced above the bottom wall and below the abutment surface and projecting orthogonally and outwardly relative to the cam block forward wall, the adjustment screw including an adjustment foot in contact with and adjacent a lower terminal edge of the first mounting plate to angularly adjust the first mounting plate relative to the cam block forward wall, and the first mounting plate including an adhesive layer formed to the first mounting plate.

4. Apparatus as set forth in claim 3, further including a non-corrosive metal insert overlay coextensively laminated to the arcuate cam surface to define an erosion resistant layer to accommodate a windshield wiper arm thereon.

* * * * *